(12) United States Patent
Chun et al.

(10) Patent No.: US 6,798,758 B1
(45) Date of Patent: Sep. 28, 2004

(54) METHOD AND APPARATUS FOR ACQUIRING CODE SYNCHRONIZATION IN A CDMA COMMUNICATION SYSTEM

(75) Inventors: Ji-yong Chun, Seoul (KR); Hyoung-woon Park, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/577,596

(22) Filed: May 25, 2000

(30) Foreign Application Priority Data

May 25, 1999 (KR) .......................................... 99-18854

(51) Int. Cl.[7] .............................................. H04B 1/707
(52) U.S. Cl. ..................................... 370/335; 370/342
(58) Field of Search ................................ 370/343, 350, 370/441, 479, 503, 510, 515; 375/134, 137, 142, 145, 354, 367

(56) References Cited

U.S. PATENT DOCUMENTS

| | | | |
|---|---|---|---|
| 3,706,933 A | * 12/1972 | Bidell et al. ............... | 375/149 |
| 5,420,850 A | * 5/1995 | Umeda et al. .............. | 370/342 |
| 5,642,377 A | 6/1997 | Chung et al. ............... | 375/200 |
| 5,644,591 A | 7/1997 | Sutton | |
| 5,818,868 A | 10/1998 | DeGaudenzi et al. | |
| 5,999,561 A | * 12/1999 | Naden et al. ............... | 375/142 |
| 6,121,793 A | * 9/2000 | Pickering et al. ............. | 326/73 |
| 6,445,714 B1 | * 9/2002 | d'Anjou et al. ............. | 370/441 |

* cited by examiner

Primary Examiner—Huy D. Vu
Assistant Examiner—Daniel Ryman
(74) Attorney, Agent, or Firm—Lee & Sterba, P.C.

(57) ABSTRACT

Acquisition of initial code synchronization in a receiving system for a code division multiple access (CDMA) signal is realized by producing a complex digital signal having K components by sampling an analog signal derived from the received CDMA-modulated signal. Components of the complex digital signal are correlated with N code phases. The energies of these correlated values are examined, in parallel, to determine whether the ratio of the maximum energy within the block to the average energy in the block equals or exceeds a predetermined threshold. If so, this is a valid maximum, and the code synchronization is complete. If not, further components of the complex digital signal are correlated with another set of N code phases, and are examined in the same manner. Accordingly, reliable determination as to whether code synchronization has been achieved can be realized with minimal influence of channel distortion in a CDMA received signal.

12 Claims, 10 Drawing Sheets

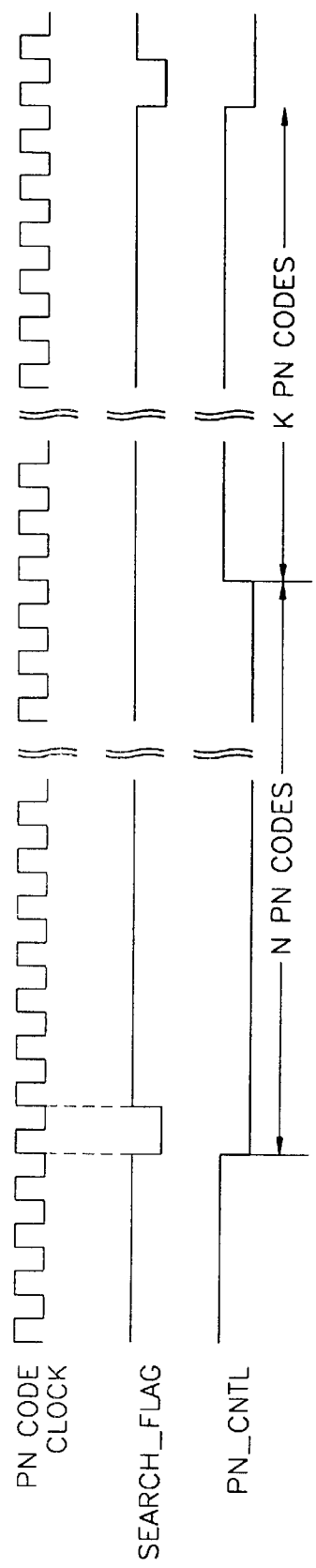

METHOD AND APPARATUS FOR ACQUIRING CODE SYNCHRONIZATION IN A CDMA COMMUNICATION SYSTEM

BACKGROUND OF THE INVENTION

1. Field of the Invention

The present invention relates to signal transmission systems using code division multiple access (CDMA) modulation techniques, and more particularly, to an initial synchronization acquisition method in a process for accomplishing synchronization of diffusion codes in a receiver of a CDMA transmission system, and an apparatus therefor.

2. Description of the Related Art

CDMA is a communications method of making a transmission channel by modulating data bits to be transmitted into diffusion codes, that is, a band diffusion digital communications method of making several transmission channels using several diffusion codes at one time. A diffusion code operates at a chip rate that is significantly higher than a data bit rate, to band-diffuse data to be transmitted. Signals of several channels can be multiplexed using the auto correlation characteristics and the cross correlation characteristics of the diffusion codes, since pseudo noise (PN) codes, which are orthogonal or quasi-orthogonal to each other, are used as the diffusion code.

The main function of PN code synchronization in CDMA is to reverse-diffuse a received signal to demodulate the same. The received signal is essentially made up of two types of digital signals. One type of signal is an information signal such as a coded audio signal, and the other type of signal, which is a PN code generated by a PN code generator, has a bit rate that is significantly higher than the information signal.

A receiver reverse-diffuses a received signal using PN codes which are generated by a local PN generator, and synchronizes the PN code with a PN code component included in the received signal. The PN code component is removed from the received signal, and then the received signal from which the PN code component has been removed is integrated for a symbol period. In this way, the original information signal can ideally be obtained.

Code synchronization usually includes the following two steps: (1) the first code synchronization acquisition step of arranging the phase of a PN code included in a received signal with the phase of a locally-generated PN code within one code chip period; and (2) the second code phase tracing step of arranging two PN code phases at accurate positions using a phase locked loop (PLL).

The present invention is directed to the first step of code sync acquisition. The code sync acquisition step is important in CDMA systems.

Techniques for code sync acquisition using several types of search and determination methods have been proposed up to now because of the importance of code sync acquisition. The proposed code sync acquisition techniques can be largely classified into the following types of techniques.

The first type is a parallel search method, in which a received signal is simultaneously correlated with all possible code phases of a locally-generated PN code in parallel, and it is determined in parallel whether the received signal is synchronized with each of the code phases. This method can reduce a code sync acquisition time, but complicates hardware.

The second type is a serial search method, in which a determination as to whether a received signal is synchronized with a locally-generated PN code is made by comparing a correlation value obtained by correlating the received signal with the locally-generated PN code, with a specific threshold. If it is determined that the received signal is synchronized with the locally-generated PN code, a code phase tracing process starts, and if it is determined otherwise, the above-described determination process is performed again after changing the phase of the internally-generated PN code. As described above, the search is performed with respect to all PN code phases that can be generated. This type of method can be considered simple compared to the parallel search method in terms of hardware, but it increases the sync acquisition time.

The time required for completing the code synchronization acquisition process, and the accuracy of synchronization, are important factors restricting the performance of CDMA receivers. Generally, the code sync acquisition process is very difficult among processes performed in CDMA systems because of a poor channel environment such as a low signal-to-noise ratio (SNR), Doppler effects and a fading environment. Among these distortion factors, a channel change due to the Doppler effect is one concern addressed by the present invention.

In a wireless mobile channel environment, the Doppler effect, which is generated when a receiver or peripheral objects move relative to a transmittar, causes a change in the channel power and channel phase with respect to the lapse of time. The variations are proportional to the speed of the moving body. When the amplitude of a received signal varies with the change in the channel power, a correlation energy value between a received signal and a local PN code also varies.

Accordingly, when the serial search method is used as in the prior art, code phases cannot be searched in the same environment since the magnitude of a received signal varies every time each local PN code phase is searched. If a local PN code phase being currently searched is an accurate code phase, the correlation energy value thereof may be significantly greater than that of the previous local PN code phase (theoretically, greater by a multiple of the processing gain of the receiver.

However, if the current channel power is significantly smaller than the previous channel power due to a change in the channel power, even though the code phase being currently searched is an accurate code phase, the correlation energy value thereof is also very small, since the amplitude of a received signal is too small. Considering the worst case, the correlation energy value of the current code phase may be equal to or, even, smaller than that of the previous inaccurate code phase.

In these circumstances, proper acquisition of code synchronization is very difficult even when using an adaptive threshold, not to mention the case of determining whether code synchronization has been achieved using a fixed threshold. A code synchronization acquisition technique using an adaptive threshold adaptively obtains a determination threshold whenever continuously calculating a change in channel power. However, this code sync acquisition technique cannot calculate a change in channel power in real time, so that it is difficult to apply adaptively-obtained thresholds at appropriate times and make a determination. Also, under circumstances of having a significantly low SNR such as in a wireless mobile channel environment, it is difficult to properly obtain a change in the channel power, so that even an adaptively-obtained determination threshold cannot be considered a correct value.

An example of an existing serial search method using a fixed threshold is disclosed in U.S. Pat. No. 5,644,591, issued Jul. 1, 1997, entitled "METHOD AND APPARATUS FOR PERFORMING SEARCH ACQUISITION IN A CDMA COMMUNICATIONS SYSTEM", assigned to Qualcomm Incorporated. An example of the existing serial search method using an adaptive threshold is disclosed in U.S. Pat. No. 5,642,377, issued Jun. 24, 1997, entitled "SERIAL SEARCH ACQUISITION SYSTEM WITH ADAPTIVE THRESHOLD AND OPTIMAL DECISION FOR SPREAD SPECTRUM SYSTEMS", assigned to Nokia Mobile Phones, Ltd.

Current parallel search methods also cause problems of existing serial search method. That is, the existing parallel search method has the same determination technique as the serial search method, except that the correlation energies of several code phases are simultaneously obtained. Thus, in current parallel search methods, it is difficult to solve problems due to changes in channel power.

SUMMARY OF THE INVENTION

To solve the above problems, a feature of the present invention includes providing a code synchronization acquisition method and device in a code division multiple access (CDMA) transmission system, by which stable code synchronization acquisition is provided, and the total time for initial code synchronization acquisition can be reduced, by drastically reducing the probabilities of false alarm and mis-detection which are caused due to a change in the power of a CDMA received signal, without being affected by noise included in the CDMA received signal, in the initial code synchronization acquisition step in a diffusion code synchronization process, in a receiver for receiving a CDMA signal using a wireless mobile channel as a transmission medium.

The invention comprises a method of acquiring initial diffusion code synchronization after receiving in a receiver CDMA-modulated signal; down-converting the CDMA signal into an analog signal; sampling the analog signal to produce a complex digital signal; performing N parallel complex correlations to obtain a correlation between the sampled complex digital signal and N parallel complex diffusion codes generated by the receiver; accumulating by components K continuously-generated parallel complex correlation results using in parallel the N parallel complex correlations; obtaining in parallel energy values of the components of the accumulating step; determining the ratio of a maximum energy value to a mean energy value using the energy values of the components; comparing the ratio with a predetermined determination threshold, and, if the ratio is greater than or equal to the determination threshold, concluding diffusion code synchronization by determining that a code phase corresponding to the maximum energy value is a correct code phase, and otherwise, determining that the code phase corresponding to the maximum energy value is an incorrect code phase.

The present invention also comprises a device for acquiring initial diffusion code synchronization after receiving in a receiver a CDMA-modulated signal, down-converting the CDMA-modulated signal into an analog signal, and sampling the analog signal to produce a complex digital signal wherein the device comprises a parallel complex correlator for generating N parallel complex correlation results indicative to the correlation between the sampled complex digital signal and N parallel complex diffusion codes generated by the receiver; a parallel complex accumulator for accumulating in parallel K continuously-generated parallel complex correlation results; a parallel energy detector for obtaining in parallel the energy values of K accumulated parallel complex correlation results; and an adaptation ratio determiner for obtaining the ratio of a maximum energy value to a mean energy value using the energy values of the K accumulated parallel complex correlation results, comparing the ratio with a predetermined determination threshold, and, if the ratio is greater than or equal to the determination threshold, generating a search conclusion signal by determining that a code phase corresponding to the maximum energy value is a correct code phase.

The invention, though, is pointed out with particularity by the appended claims.

BRIEF DESCRIPTION OF THE DRAWINGS

The above features and advantages of the present invention will become more apparent upon review of preferred embodiments with reference to the attached drawings in which:

FIG. 6 is a timing diagram of a control signal;

DESCRIPTION OF THE PREFERRED EMBODIMENT

Figure 1:
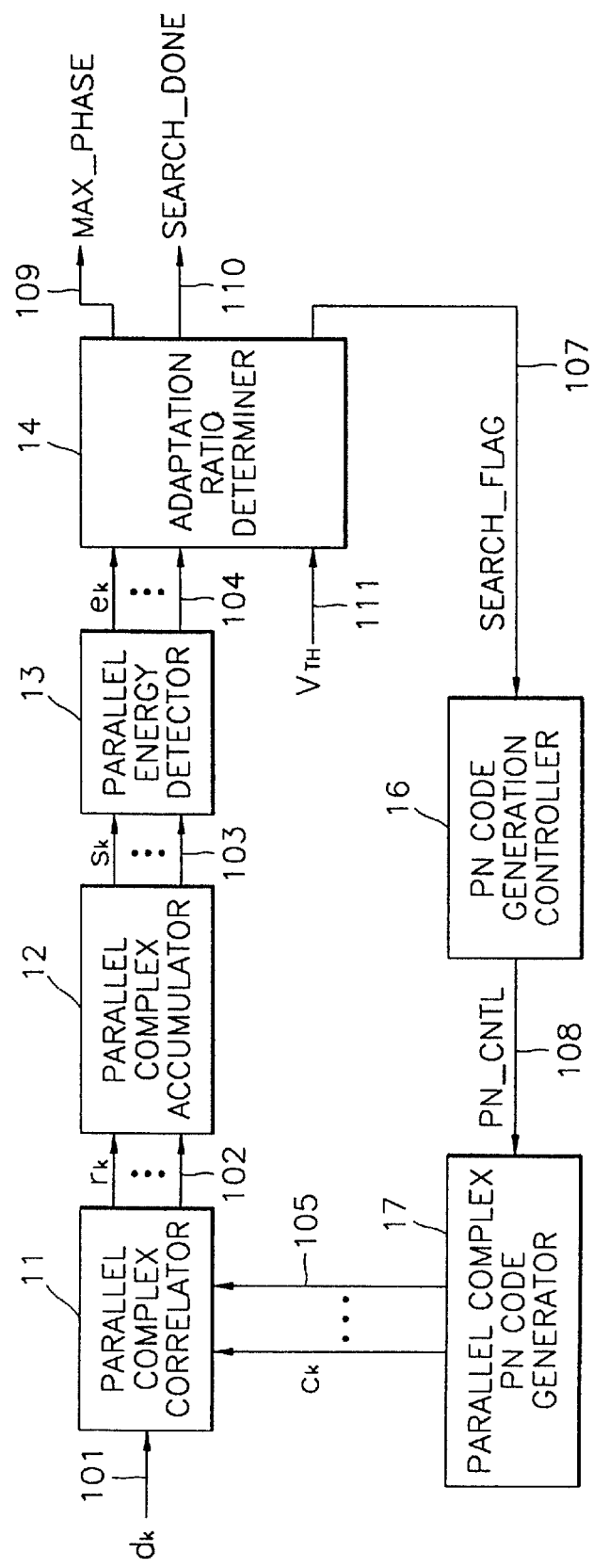
FIG. 1 is a block diagram illustrating the structure of the present invention.

Referring to FIG. 1, an embodiment of a code phase acquisition apparatus in a code division multiple access (CDMA) receiver according to the present invention includes a parallel complex correlator 11, a parallel complex accumulator 12, a parallel energy detector 13, an adaptation ratio determiner 14, a pseudo noise (PN) code generation controller 16 and a parallel complex PN code generator 17.

The parallel complex correlator 11 complex correlates a received $d_k$ data sample signal 101 with a $c_k$ vector signal 105 made up of N internally-generated parallel complex PN codes, in parallel.

The parallel complex accumulator 12 accumulates the correlation values of K consecutive sample signals for each component of an $r_k$ vector signal 102 output by the parallel complex correlator 11.

The parallel energy detector 13 obtains an energy value for each complex component of an $s_k$ vector signal 103, a complex signal output by the parallel complex accumulator 12.

The adaptation ratio determiner 14 receives an $e_k$ vector signal 104 from the parallel energy detector 13, and a determination threshold $V_{TH}$ 111, and determines achievement or non-achievement of a code synchronization using the statistical characteristics of the $e_k$ vector signal 104.

The PN code generation controller 16 controls the operation of the parallel complex PN code generator 17 using a signal SEARCH_FLAG 107 among the output signals of the adaptation ratio determiner 14.

The parallel complex PN code generator 17 generates the $c_k$ vector signal 105 made up of N parallel complex PN codes having code phases, under the control of a signal PN_CNTL 108 output by the PN code generation controller 16.

Figure 2:
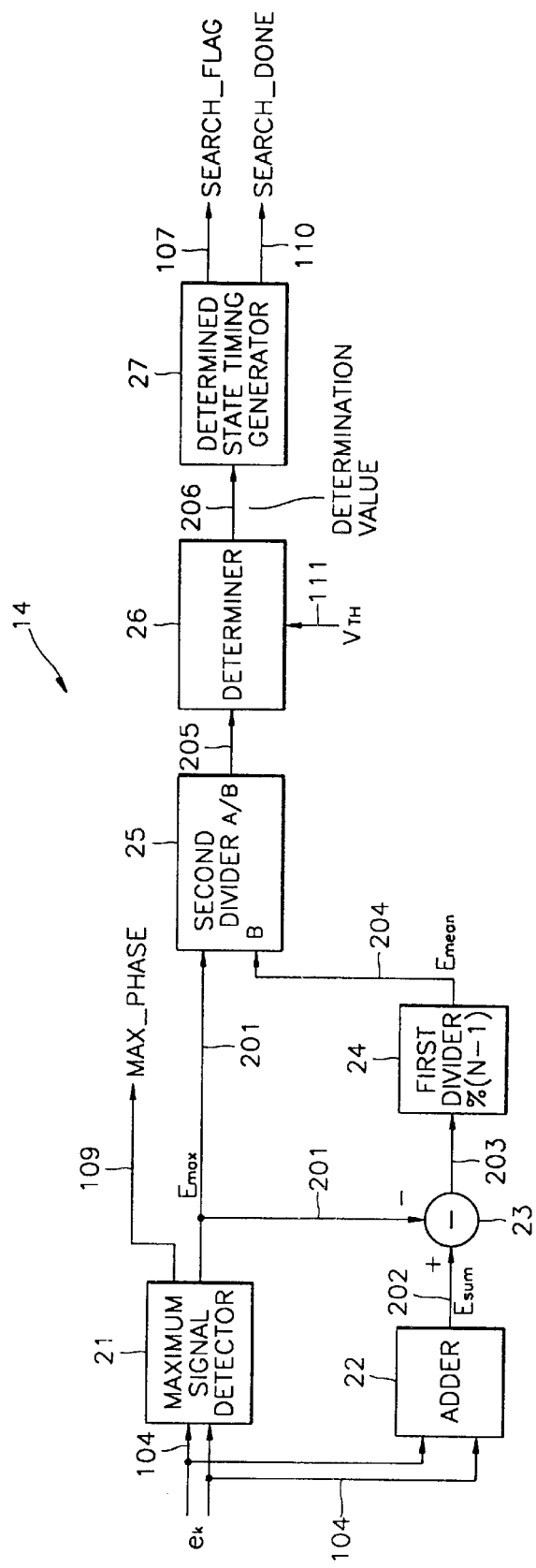
FIG. 2 illustrates the structure of an adaptation ratio determiner.

Referring to FIG. 2, the adaptation ratio determiner 14 of FIG. 1 includes a maximum signal detector 21, an adder 22, a subtracter 23, a first divider 24, a second divider 25, a determiner 26 and a determined state timing signal generator 27. The maximum signal detector 21 detects the maximum energy value $E_{max}$ 201 from N energy components of the $e_k$ vector signal 104.

The adder 22 sums all of the N energy components of the $e_k$ vector signal 104.

The subtracter 23 subtracts the maximum energy value $E_{max}$ 201 output by the maximum signal detector 21, from $E_{sum}$ 202 output by the adder 22. The first divider 24 generates a mean energy value $E_{mean}$ 204 by dividing the output signal 203 of the subtracter 23 by (N−1).

The second divider 25 divides the maximum energy value $E_{max}$ 201 output by the maximum signal detector 21, by the mean energy value $E_{mean}$ 204 output by the first divider 24.

The determiner 26 determines whether the output of the second divider 25 is greater than a predetermined determination threshold $V_{TH}$ 111.

The determined state timing signal generator 27 generates the SEARCH_FLAG signal 107 and a SEARCH_DONE signal 110 from a determined value 206, output by the determiner 26.

Figure 4:
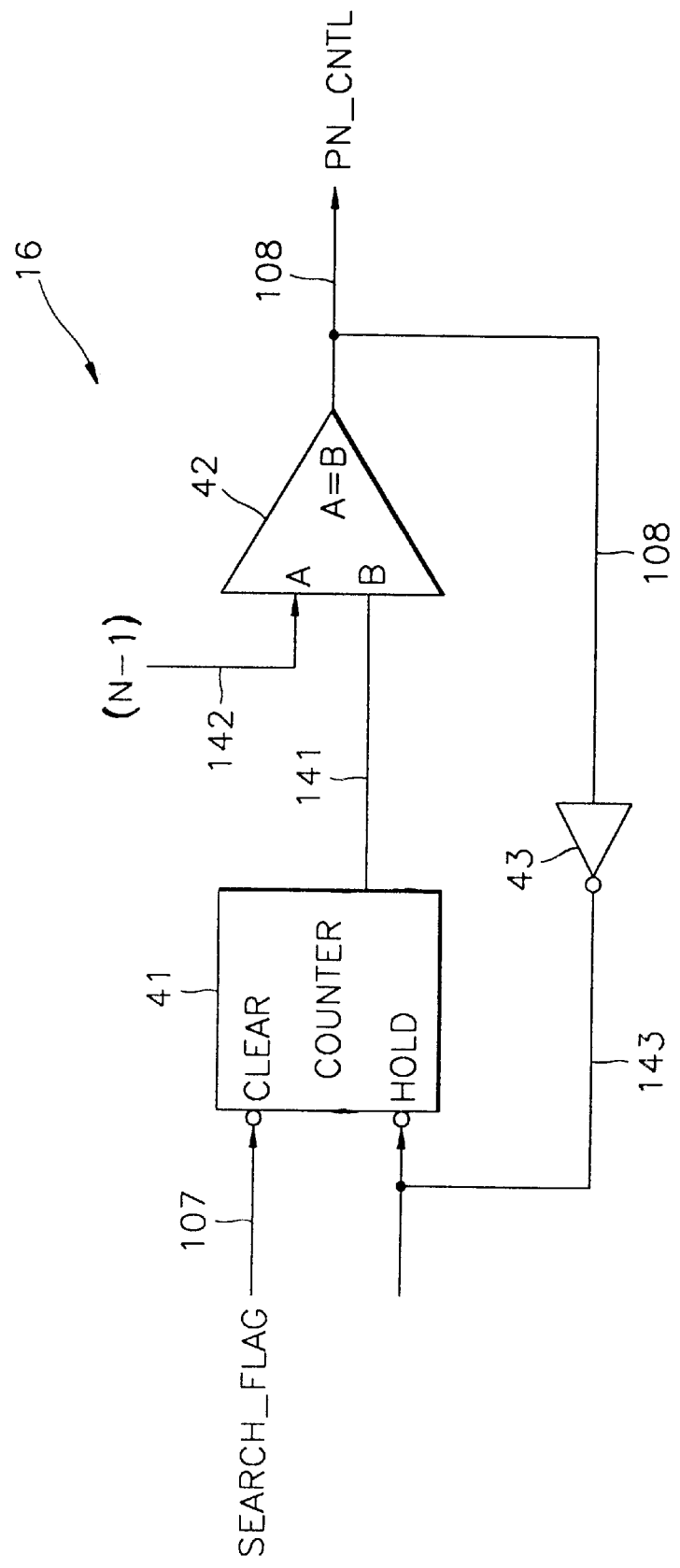
FIG. 4 illustrates the structure of a pseudo noise (PN) code generation controller.

Referring to FIG. 4, the PN code generation controller 16 of FIG. 1 includes a counter 41 which is reset by the SEARCH_FLAG signal 107, a comparator 42, and an inverter 43. The comparator 42 compares the output value of the counter 41 with (N−1) to determine whether the output value of the counter 41 is equal to (N−1), and outputs the result of the comparison as a PN_CNTL signal 108. The inverter 43 inverts the PN_CNTL signal 108 and outputs a control signal for controlling the count hold operation of the counter 41.

The operation principle of the present invention will now be described in detail with reference to the attached drawings.

Referring to FIG. 1, a CDMA $d_k$ signal 101, is received via an antenna, down-converted into an intermediate frequency (IF) signal, demodulated back into a base band signal, and sampled by an analog-to-digital converter ADC (not shown). The received $d_k$ signal 101 is a complex signal having an In phase and a Quadrature phase as expressed by Equation 1:

$$d_k = d_{k,i} + j d_{k,q} \tag{1}$$

The $d_k$ signal 101 is a signal which has passed through a wireless mobile channel in a CDMA transmission system, and the wireless mobile channel, which is a complex channel, is modelled by Equation 2:

$$h(t) = \Sigma A(t) * e^{jq} \tag{2}$$

wherein A(t) denotes the size of a channel which varies with time, wherein the variation has a Rayleigh distribution. Also, q denotes the phase of a complex channel, which has a uniform distribution in the range of (0,2Π).

The $d_k$ signal 101 is applied to the parallel complex correlator 11. The parallel complex correlator 11 also receives a $c_k$ vector signal 105 which is output by the parallel complex PN code generator 17. The $c_k$ vector signal 105 is made up of N locally-generated complex PN codes as expressed by Equation 3:

$$c_k = [c_k, c_{k-1}, c_{k-2}, \ldots, c_{k-N+2}, c_{k-N+1}]^T \tag{3}$$

wherein T denotes a vector transpose. Here, each component is a complex conjugate. That is, the $c_k$ vector signal 105 can be expressed as in Equation 4:

$$c_k = c_{k,i} - j c_{k,q} \tag{4}$$

The parallel complex correlator 11 complex-correlates the $d_k$ signal 101 with each component of the $c_k$ vector signal 105 in parallel to output an $r_k$ vector signal 102 which is expressed in Equation 5 as:

$$r_k = d_k^* c_k = [r_k, r_{k-1}, \ldots, r_{k-N+2}, r_{k-N+1}]. \tag{5}$$

Here, the $r_k$ vector signal 102 has N components, each of which is a complex signal, which are the results of the complex correlation between the $d_k$ signal 101 and each component of the $c_k$ vector signal 105. That is, the $r_k$ vector signal 102 can be expressed in Equation 6 as:

$$r_k = r_{k,i} + j r_{k,q} = d_k^* c_k = (d_{k,i} c_{k,i} + d_{k,q} c_{k,q}) + j(d_{k,q} c_{k,i} - d_{k,i} c_{k,q}). \tag{6}$$

The $r_k$ vector signal 102 is received by the parallel complex accumulator 12, and the In phase part (real part) and Quadrature phase part (imaginary 10 part) of each component of the $r_k$ vector signal 102 are accumulated separately, thereby outputting the $s_k$ vector signal 103. The $s_k$ vector signal 103 is made up of N components, each of which is a complex signal. This is expressed in Equations 7 and 8 as:

$$s_k = [s_k, s_{k-1}, s_{k-2}, \ldots, s_{k-N+2}, s_{k-N+1}]^T \tag{7}$$

$$s_k = \sum_{m=0}^{K-1} r_{km,i} + j r_{km,q} \tag{8}$$
$$= s_{k,i} + j s_{k,q}$$

The parallel energy detector 13 receives the $s_k$ vector signal 103 which is output by the parallel complex accumulator 12, and calculates an energy for each component in parallel, to output the $e_k$ vector signal 104. The $e_k$ vector signal 104 has N components, each of which is an energy value of a corresponding component of the $s_k$ vector signal 103, which is a real number. This is expressed in Equations 9 and 10 as:

$$e_k = [e_k, e_{k-1}, e_{k-2}, \ldots, e_{k-N+2}, e_{k-N+1}]^T \tag{9}$$

$$e_k = |s_k|^2 = (s_{k,i} + j s_{k,q})(s_{k,i} + j s_{k,q}) = s_{k,i}^2 + s_{k,q}^2 \tag{10}$$

The adaptation ratio determiner 14 receives the $e_k$ vector signal 104, obtains a maximum energy value $E_{max}$ from N energy components $e_k$, and obtains a mean value $E_{mean}$ of the remaining (N−1) components not including the maximum energy value $E_{max}$. Then, the adaptation ratio determiner 14 compares the ratio of the two values with a determination threshold $V_{TH}$ 111 to determine whether a code phase corresponding to the maximum energy value is a correct code phase, to output the SEARCH_FLAG signal 107 and the MAX_PHASE signal 109. A clock signal used in this process is a CHIP_CLK signal (not shown), which has a period that is the same as a PN code chip period. The MAX_PHASE signal 109 is a code phase corresponding to the maximum energy value obtained from the vector signal $e_k$ 104. The SEARCH_FLAG signal 107 is input to the PN code generation controller 16. Here, the SEARCH_FLAG signal 107 becomes 1 when the maximum energy value $E_{max}$ obtained from the vector signal $e_k$ 104 is greater than the determination threshold $V_{TH}$ 111, and becomes 0 when the maximum energy value $E_{max}$ is smaller than the determination threshold $V_T H$ 111. The SEARCH_DONE signal 110, which is another output signal of the adaptation ratio determiner 14, is a state signal representing that a code synchronization acquisition process has been completed when a correct code phase was found in the code synchronization acquisition process. That is, the SEARCH_DONE signal 110 becomes 1 when a correct code phase is found, and otherwise, remains 0.

The PN code generation controller 16 controls the operation of the parallel PN code generator 17 by outputting the PN_CNTL signal 108 in response to the value of the received SEARCH_FLAG signal 107. When a correct code phase has not been found after a code synchronization search with respect to N code phases is completed, the PN code generation controller 16 controls the parallel complex PN code generator 17 to effectively generate the next N code phases. When the current N code phases are as in Equation 11, the next N code phases are as in Equation 12:

$$[C_K, C_{K-1}, C_{K-2}, \ldots, C_{K-N+2}, C_{K-N+1}] \quad (11)$$

$$[C_{K-N}, C_{K-N-1}, C_{K-N-2}, \ldots, C_{K-2N+2}, C_{K-2N+1}] \quad (12)$$

Accordingly, after the synchronization search with respect to the current N code phases is completed, the PN code generation controller 16 holds the operation of the parallel complex PN code generator 17 for N PN code periods to allow the parallel complex PN code generator 17 to generate a complex PN code having the next N phases.

The parallel complex PN code generator 17 generates the $c_k$ vector signal 105, which is a complex PN code signal, under the control of the PN_CNTL signal 108. The $c_k$ vector signal 105 is made up of complex codes having consecutive phases as shown in Equation 3, and is input to the parallel complex correlator 11.

Referring to FIG. 2, in the detailed operation of the adaptation ratio determiner shown in FIG. 1, the received $e_k$ vector signal 104 is input to the maximum signal detector 21. The maximum signal detector 21 detects the greatest energy value from N components of the $e_k$ vector signal 104 to output a maximum value $E_{max}$ 201, and simultaneously outputs the index of a code phase corresponding to the largest energy value as the MAX_PHASE signal 109. This relationship is expressed as in Equation 13:

$$E_{max} = \max[e_k, e_{k-1}, e_{k-2}, \ldots, e_{k-N+2}, e_{k-N+1}]$$

$$\text{MAX\_PHASE} = \text{index of } E_{max} \quad (13)$$

The $e_k$ vector signal 104 is also applied to the adder 22. The adder 22 sums all of the N components of the $e_k$ vector signal 104 to obtain $E_{sum}$ 202. The subtracter 23 subtracts the maximum energy value $E_{max}$ 201 from the output signal $E_{sum}$ 202 of the adder 22.

The first divider 24 divides the resultant value 203 of the subtraction by the subtracter 23 by (N−1) to obtain the mean energy value $E_{mean}$ 204. The second divider 25 divides the maximum energy value $E_{max}$ 201 by the mean energy value $E_{mean}$ 204 to obtain an adaptation ratio signal R 205.

The determiner 26 compares the adaptation ratio R signal 205 with the determination threshold $V_{TH}$ 111 and outputs a determination value 206. The determination value 206 is 1 when the adaptation ratio R 205 is greater than or equal to the determination threshold $V_{TH}$ 111, and is 0 when the adaptation ratio R 205 is smaller than the determination threshold $V_{TH}$.

The determined state timing signal generator 27 receives the determination value 206 and outputs the SEARCH_FLAG signal 107 for controlling the generation of complex PN codes, and the SEARCH_DONE signal 110 representing completion or non-completion of a code synchronization acquisition process. The SEARCH_FLAG signal 107 is always maintained 1 during the period when the correlation values for K samples are accumulated, and changes its value for one PN code period according to the result of the determination as to whether or not code synchronization has been achieved. That is, when it is determined that a correct code phase has been found, the SEARCH_FLAG signal is continuously 1, and otherwise, it is zero for one PN code period. The SEARCH_DONE signal 110 is 0 when it is determined that code synchronization has not been acquired, and becomes 1 when it is determined that code synchronization has been acquired. In this way, the code synchronization acquisition process is completed.

Figure 3:
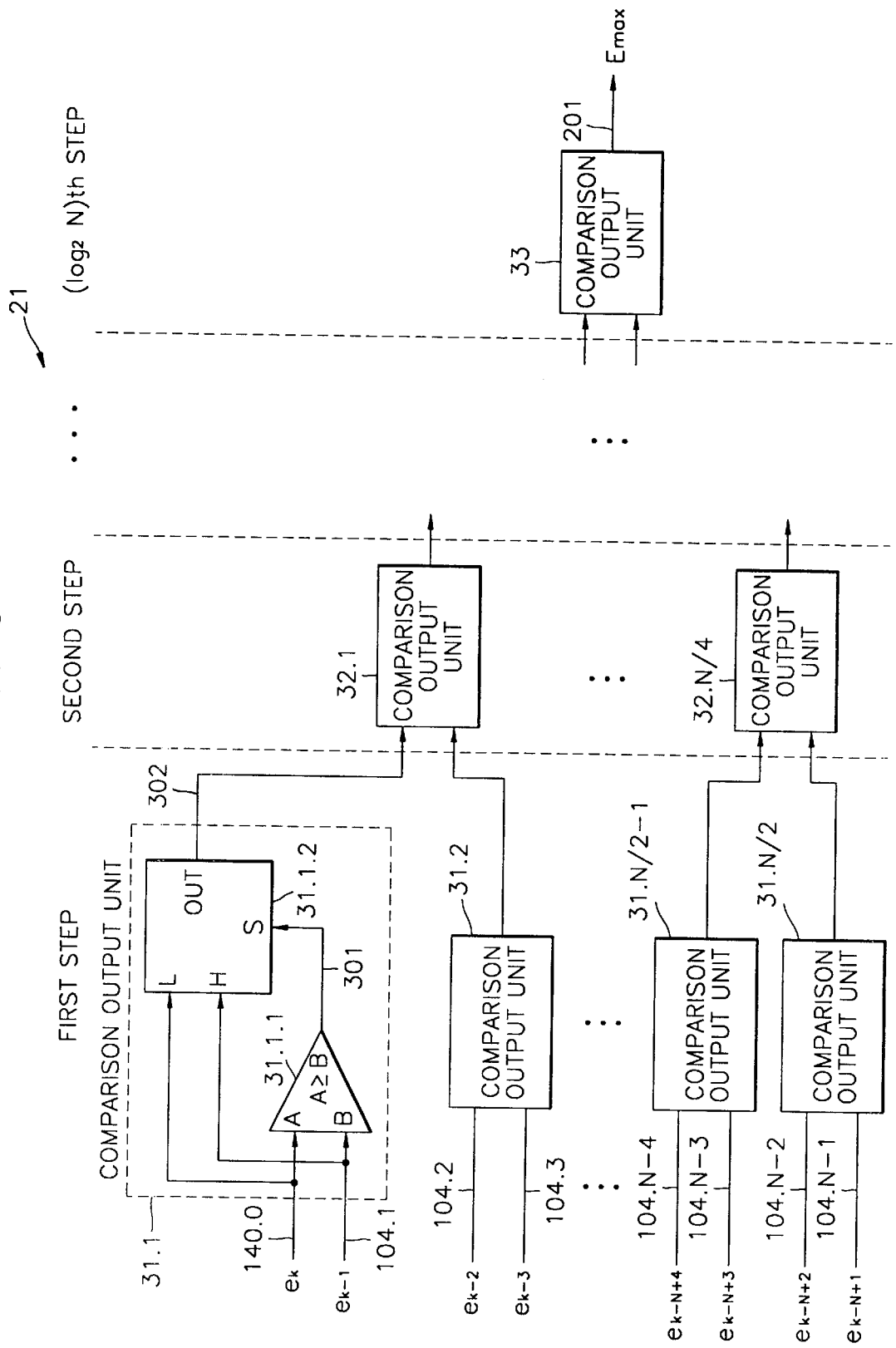
FIG. 3 illustrates the structure of a maximum signal detector.

FIG. 3 illustrates the detailed configuration of the maximum signal detector 21 of FIG. 2. N received signals $e_k$ 104.0 through $e_{k-N}+1$ 104.N−1 denote the components of the $e_k$ vector signal 104 output from the parallel energy detector 13 of FIG. 1. In the first step, a pair of consecutive signals are applied to each comparison output unit 31.1 through 31.N/2. As shown in FIG. 3, received signals $e_k$ 104.0 and $e_{k-1}$ 104.1 are applied to a comparison output unit 31.1, and received signals $e_{k-n+2}$ 104.N−2 and $e_{k-}N+1$ 104.N−1 are applied to a comparison output unit 31.N/2. In the second step, pairs of output signals, one signal from each of two consecutive comparison output units in the first step, are applied to comparison output units 32.1 through 32.N/4. The number of comparison targets can be reduced by increasing the number of steps as described above, and the last step, the ($\log_2$ N)th step, requires only one comparison output unit 33. The last comparison output unit 33 compares two signals from the previous step with each other to obtain the maximum energy value $E_{max}$ 201.

The detailed structure of the comparison output units will now be described by taking the comparison output unit 31.1 as an example. The structures of the remaining comparison output units are the same as the comparison output unit 31.1. A comparator 31.1.1 in the comparison output unit 31.1 receives two signals 104.0 and 104.1 via its A and B ports, respectively, and outputs a comparison result value 301. The comparison result value 301 is 1 if the signal received by the A port is greater than or equal to the signal received by the B port, and otherwise, is 0. A selector 31.1.2 receives the signals $e_k$ 104.0 and $e_{k-1}$ 104.1 via its L port and its H port, respectively, and selectively outputs the received signals via its OUTPUT port 302 according to the comparison result value 301 of the comparator 31.1.1. That is, the H port received signal 104.1 is output via the OUTPUT port 302 when the comparison result value 301 received via the S port is 1, and the L port received signal 104.0 is output via the OUTPUT port 302 when the comparison result value 301 received via the S port is 0.

Referring to FIG. 4, in the detailed operation of the PN code generation controller 16 of FIG. 1, the SEARCH_FLAG signal 107 is received from the adaptation ratio determiner 14 via the CLEAR port of a counter 41. The CLEAR port, which is a low-active port, resets the output value 141 of the counter 41 to 0 when 0 is received. The counter 41 increases the count output value 141 once per PN code period only when the signal input to the CLEAR port is 1. A comparator 42 continuously compares the count output value 141 with an (N−1) value 142 to determine whether the count output value 141 is consistent with the (N−1) value 142, and generates 0 if it is determined that the count output value 141 is not consistent with the (N−1) value 142, and otherwise, generates 1, and outputs 0 or 1 as the PN_CNTL signal 108 to the outside. Also, the PN_CNTL signal 108 is inverted by an inverter 43 and applied to the HOLD port of the counter 41. The HOLD port, which is a low active port, no longer increases the count output value 141 when 0 is received, and increases the count output value 141 when 1 is received. FIG. 6 shows the timing relationship between the received SEARCH_FLAG signal 107 and the output PN_CNTL signal 108.

Figure 5:
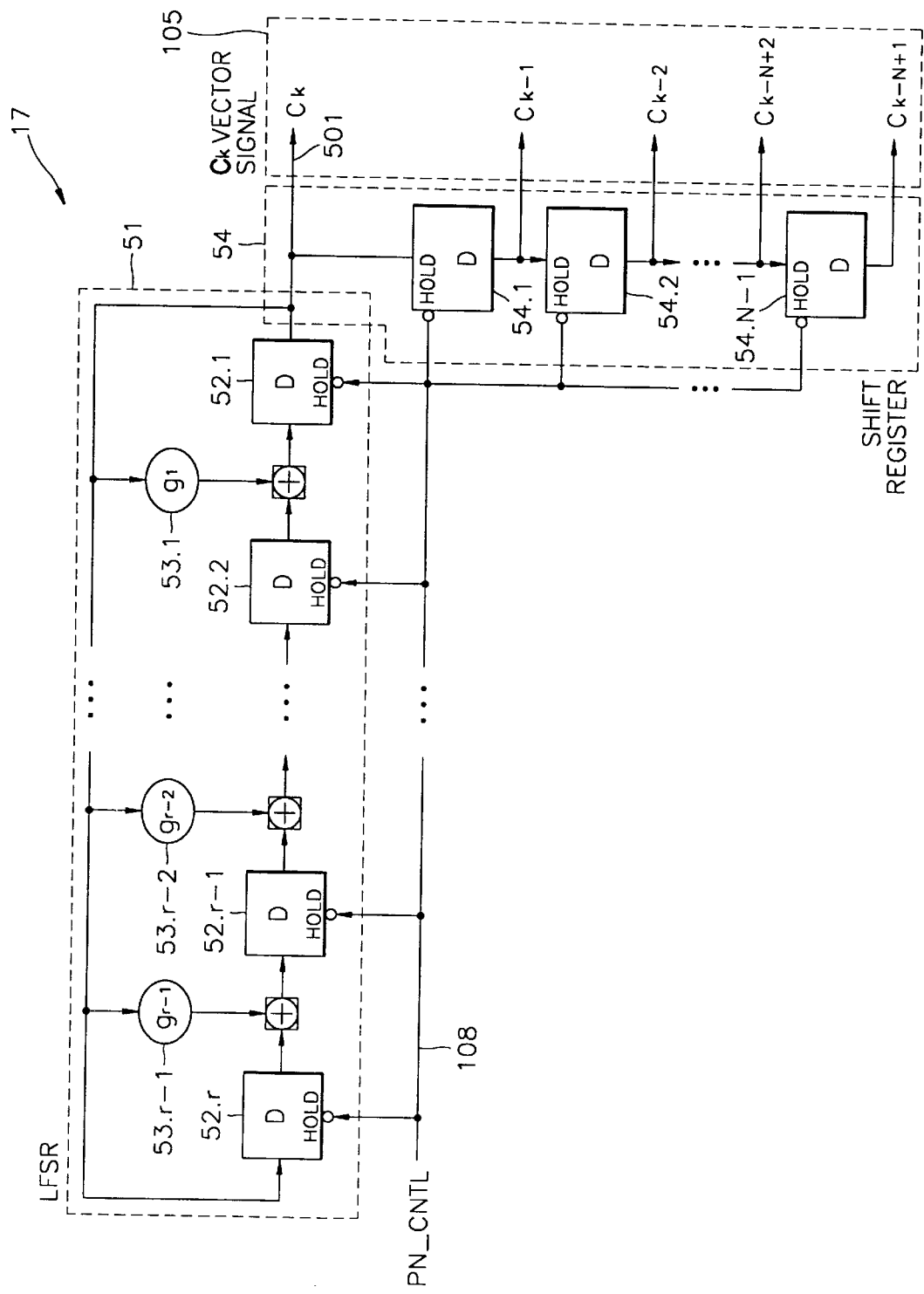
FIG. 5 illustrates the structure of a parallel complex PN code generator.

Referring to FIG. 5, the detailed operation of the parallel complex PN code generator 17 of FIG. 1 will now be described. Here, only generation of an in-phase PN code is described. The generation of a Quadrature PN code is the same as the generation of the In-phase PN code except for a generator polynomial expression.

The degree of the generator polynomial G(x) is assumed to be an r-th degree. Accordingly, the generator polynomial G(x) is expressed as in Equation 14:

$$G(x) = x^r + g_{r-1}x^{r-1} + g_{r-2}x^{r-2} + \ldots + g_1x + 1 \quad (14)$$

wherein $g_{r-1}, g_{r-2}, \ldots g_1$ are the coefficients of the generator polynomial G(n) and have a value $\{0,1\}$. $g_r$ and $g_0$ are always 1. A linear feedback shift register (LFSR) 51 sets the initial values of (r−1) D flip flops 52.r through 52.2, among D flip flops 52.r through 52.1, to be 0, and sets the initial value of the remaining D flip flop 52.1 to be 1. The initial value in this embodiment is a typical value, but can be set as different values as necessary. The coefficients of the generator polynomial control the operations of gates 53.r−1 through 53.1. For example, the gate 53.1 outputs its input without variation when the coefficient $g_1$ of the generator polynomial expression is 1, or always outputs 0 independently of its input when the coefficient $g_1$ is 0.

A shift register 54 receives the $c_k$ signal 501 output from the LFSR 51, and generates the $c_k$ vector signal 105 of FIG. 1. The shift register 54 includes (N−1) D flip flops 54.1 through 54.N−1, and operates similarly to a serial/parallel conversion register.

The PN_CNTL signal 108 is input to the hold port of each of D flip flops 52.r through 52.1 in the LFSR 51. When the hold port, which is an active low port, receives 0, the shift operation of each D flip flop is stopped, and the state is held. When 0 is received via the hold port, each D flip flop performs shifting. A PN code chip clock is supplied to each D flip flop. Thus, ck signals 501 are continuously generated by the LFSR 51 during K PN code periods, so that a vector signal 105 is generated by continuous shifting of the D flip flops 54.1 through 54.N−1 in the shift register 54. Then, when the PN_CNTL signal 108 is 0 during N PN code periods, the D flip flops 52.r through 52.1 stop shifting and hold their previous states during N PN code periods. Simultaneously, the D flip flops 54.1 through 54.N−1 in the shift register 54 also stop their shifting operations and hold their previous values during N PN code periods, so that the value of the vector signal 105 is maintained without change during N PN code periods.

The PN_CNTL signal 108 is also applied to the shift register 54 via its internal D flip flops 54.1 through 54.N−1. The control of the operation of the shifter register 54 by the PN_CNTL signal 108 is the same as the control of the operation of the LFSR 51 by the PN_CNTL signal 108.

This alternate shifting and holding allows a PN code phase to be changed at a desired position. That is, first, K results of parallel complex correlation of the $c_k$ vector signal 105, which is continuously generated during K PN code periods, with the $d_k$ signal 101 of FIG. 1 are accumulated in parallel during K PN code periods to search N code phases all at once. When a correct code synchronization has not been found after determination as to whether code synchronization has been made using the results of the accumulation, the $c_k$ vector signal 105 having the next N code phases is generated. The code phase is a relative comparison value between the index of the $d_k$ signal 101 and a PN code index. Since the $d_k$ signal 101 is continuously sampled and received, holding of the value of the $c_k$ vector signal 105 during N PN code periods as described above changes the relative code phase between the $d_k$ signal 101 and the $c_k$ vector signal 105 by N PN codes. That is, the $c_k$ vector signal 105 having the next N code phases can be generated.

Figure 7A:
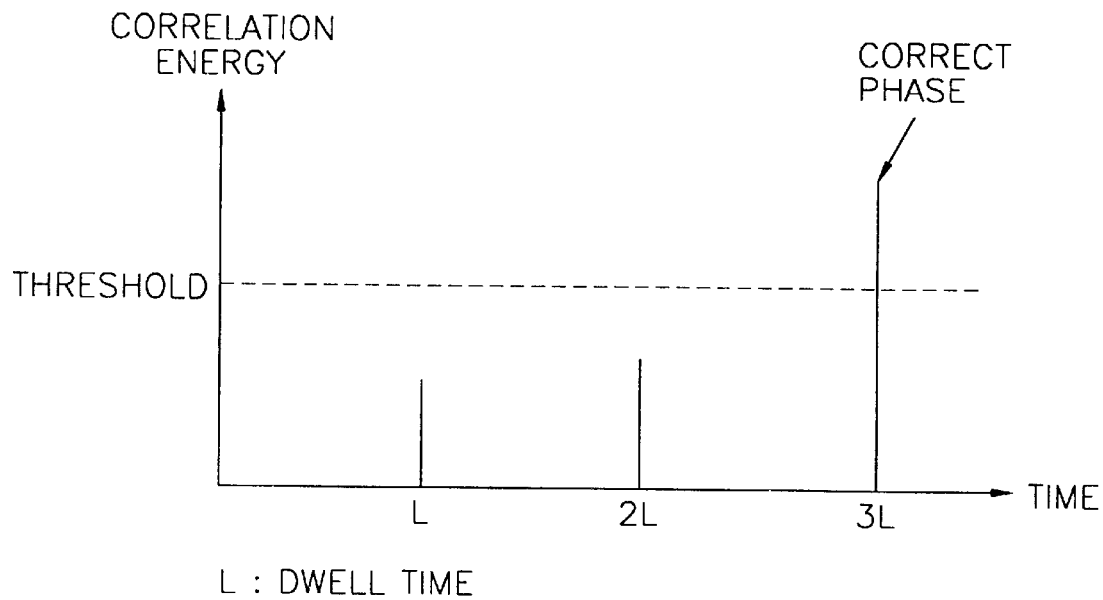
FIGS. 7A through 7D are graphs showing a comparison of the effects of the present invention with a conventional search method.
Figure 7B:
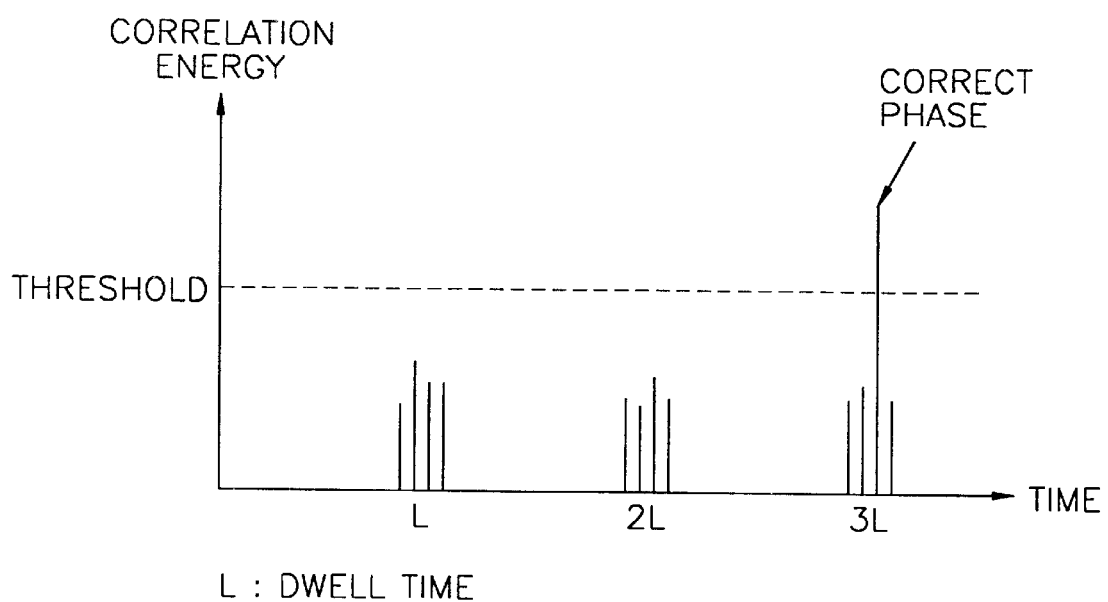
Figure 7C:
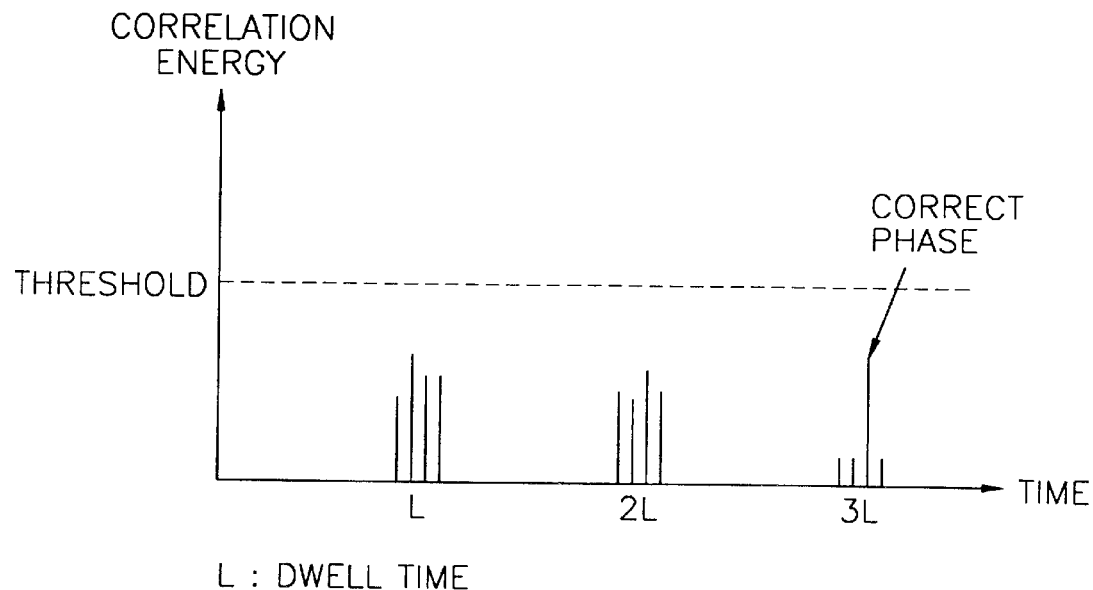
Figure 7D:
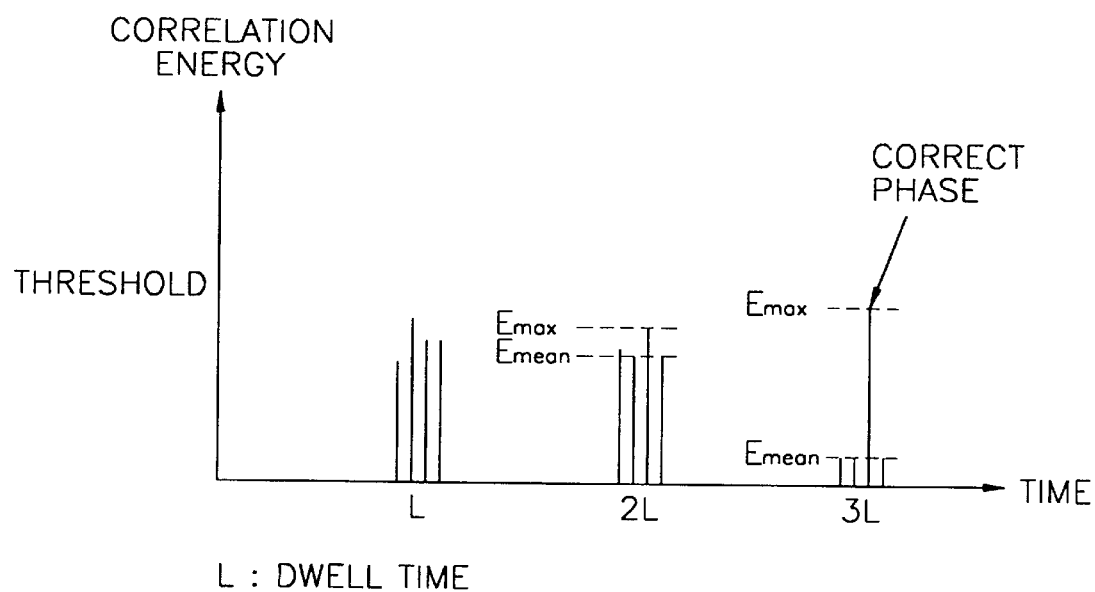

FIGS. 7A through 7D are used to compare the effects of the present invention with the effect of a conventional search technique. FIG. 7A shows the results of a determination by a conventional serial search technique, and FIG. 7B shows the results of a determination (when N is 4) by a conventional parallel search technique when there is no change in channel power. FIG. 7C shows the results of a determination (when N is 4) by a conventional parallel search technique when the channel power varies, and FIG. 7D shows the results of a determination (when N is 4) by an adaptation ratio determination technique according to the present invention when the channel power varies.

A computer simulation was conducted to verify the performance of the present invention, wherein the Doppler frequency in a wireless mobile channel is set to be 83 Hz and the number (N) of parallels upon parallel searching is set to be 16. The results of the computer simulation are shown in FIGS. 8A and 8B.

Figure 8A:
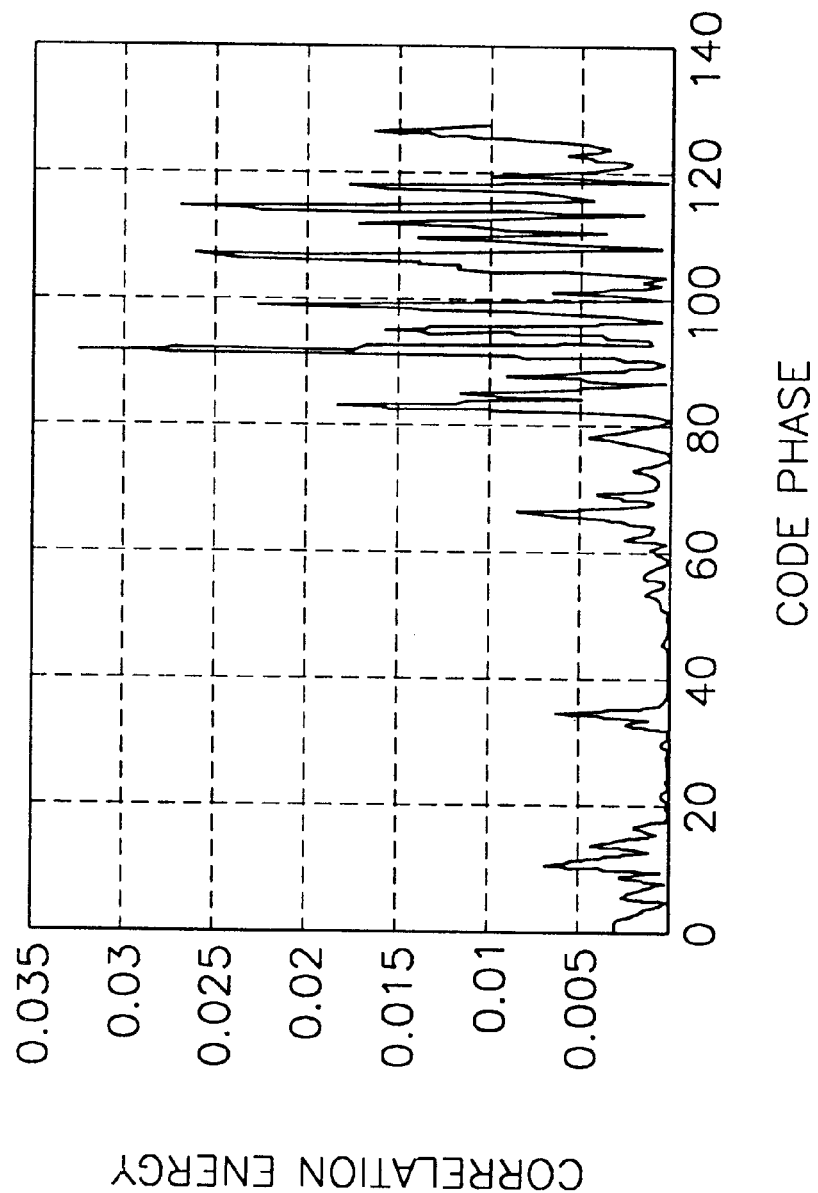
FIGS. 8A and 8B show the results of a computer simulation for verifying the performance of the present invention.

FIG. 8A shows a correlation energy in each code phase which is searched, wherein a desired code phase is the thirty third code phase on the x axis. However, it becomes evident from FIG. 8A that the correlation energy is the greatest at a code phase of 92, and that correlation energies at or above a code phase of 60 are significantly greater than those below the 60 code phase. This is because the channel power at or above the code phase of 60 is much greater than the channel power below the code phase of 60, due to a variation in the channel power caused by the Doppler effect. If the correlation energies shown in FIG. 8A are determined by a simple comparison with a particular determination threshold as in an existing determination technique, the correct code phase of 33 cannot be found.

However, in the present invention, the correct code phase can be acquired by dividing the correlation energies of FIG. 8A into N correlation energies (here, N=16) and obtaining and determining the statistics within the divided group.

Figure 8B:
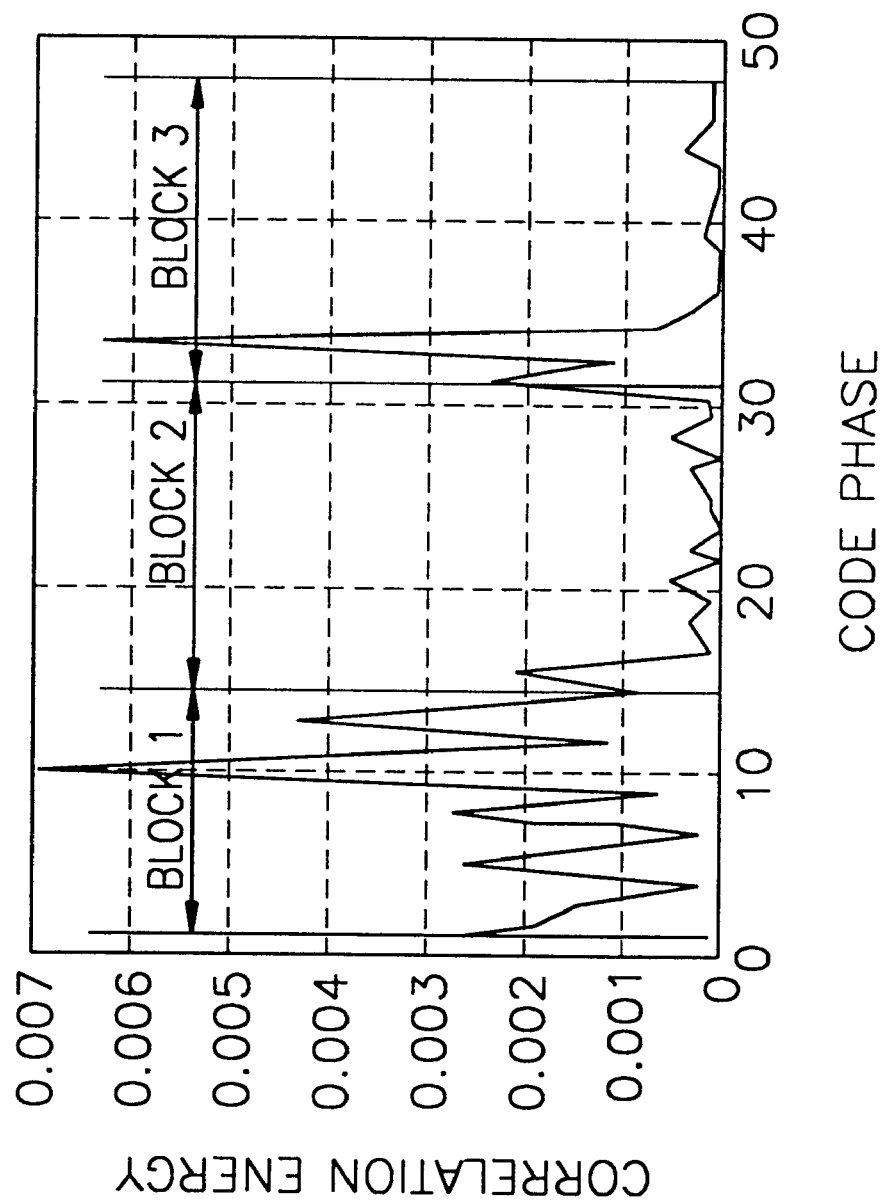

FIG. 8B is a graph showing a magnification of the range between a code phase of 1 and a code phase of 48. Referring to FIG. 8B, the results of 48 code phases are divided in units of 16 code phases (because N is 16), and divided groups are set to be block 1, block 2, and block 3. The correct code phase of 33 is in block 3. Also, a maximum correlation energy is at a code phase of 10 among the 48 code phases, but the code phase of 10 is not determined to be the correct code phase by the adaptation ratio determination of the present invention since the mean energy of block 1 to which the code phase of 10 pertains is also large.

In the case of block 3 to which the correct code phase of 33 pertains, the correlation energy at the code phase of 33 is great, while the mean energy is very small. Thus, the code phase of 33 can be determined to be the correct code phase by the adaptation ratio determination technique of the present invention.

TABLE 1

Statistical distribution of each block

| | $E_{max}$ | $E_{mean}$ | $R = E_{max}/E_{mean}$ |
|---|---|---|---|
| block 1 | 0.00687 | 0.00194 | 3.54 |
| block 2 | 0.00247 | 0.00019 | 12.97 |
| block 3 | 0.00644 | 0.00022 | 28.92 |
| block 4 | 0.00270 | 0.00064 | 4.23 |
| block 5 | 0.00837 | 0.00183 | 4.58 |
| block 6 | 0.03253 | 0.00509 | 6.39 |
| block 7 | 0.02605 | 0.00661 | 3.94 |
| block 8 | 0.02695 | 0.00670 | 4.02 |

Table 1 shows the maximum energy, the mean energy and the adaptation ratio R of each block having 16 phase codes in FIG. 8A.

According to the present invention, a determination whether code synchronization has been made can be made stably without being influenced by distortion in a CDMA received signal caused by channel distortion in a wireless mobile channel, during initial code synchronization acquisition in a system for transmitting a signal using the CDMA technique in a wireless mobile channel environment.

Also, a stable CDMA reception system can be achieved by drastically reducing the probabilities of false alarm and miss detection which are caused due to a power change in a CDMA received signal during initial code synchronization acquisition.

Furthermore, the total time for initial code synchronization acquisition can be significantly reduced by drastically reducing the probabilities of false alarm and miss detection which are caused due to a power change in a CDMA received signal during initial code synchronization acquisition.

As to the effect of the present invention that can be obtained in terms of realization, an initial code synchronization acquisition apparatus can be effectively realized in software, by parallel processing the initial code synchronization acquisition apparatus which is suitable to realize the existing hardware. Also, the present invention provides a technique of obtaining a determination threshold by calculating the characteristics and distribution of correlation energies with respect to several code phases, so that it can utilize the operation of software well.

The present invention is applicable to all signal transmission systems using a direct sequence CDMA (DS-CDMA), particularly to systems such as current cellular phones, personal communication systems (PCSs) or the like, and to receivers of third generation mobile communication apparatuses, such as, IMT-2000.

What is claimed is:

1. A method of acquiring initial diffusion code synchronization after receiving in a receiver CDMA-modulated signal, down-converting the CDMA signal into an analog signal, and sampling the analog signal to produce a complex digital signal, the method comprising:

(a) performing N parallel complex correlations to obtain a correlation between components of the sampled complex digital signal and N parallel complex diffusion codes generated by the receiver;

(b) accumulating, in parallel, components K continuously-generated parallel complex correlation results using, in parallel, the N parallel complex correlations;

(c) obtaining, in parallel, energy values of the components of the accumulating step; and (d) determining a ratio of a maximum energy value to a mean energy value using the energy values of the components, comparing the ratio with a predetermined determination threshold, and, if the ratio is greater than or equal to the determination threshold, concluding diffusion code synchronization by determining that a code phase corresponding to the maximum energy value is a correct code phase, and otherwise, determining that the code phase corresponding to the maximum energy value is an incorrect code phase.

2. The method of claim 1, further comprising (e) generating N parallel complex diffusion codes having N code phases, which are unique from the N parallel complex diffusion codes used previously in steps (a)–(d), and repeating the steps (a) through (d), for additional components of the complex digital signal, when it is previously determined in step (d) that there are no correct code phases within the code phases of the N parallel complex diffusion codes.

3. The method of claim 2, wherein a relative code phase between a received complex digital signal and a parallel complex diffusion code is changed into N code phases by maintaining the parallel complex diffusion code without variation, during N PN code periods, and the relative code phase is maintained without variation by generating the parallel complex diffusion codes while shifting the parallel complex diffusion codes in response to a periodically-received complex digital signal, during the next K PN code periods.

4. The method of claim 1, wherein the maximum energy value is set to be the greatest energy value among the energy values of respective components, and the mean energy value is set to be the mean value of (N−1) energy values not including the maximum energy value.

5. The method of claim 4, wherein the mean energy value is obtained by subtracting the maximum energy value from the sum of the N energy values and dividing the result of the subtraction by (N−1).

6. A device for acquiring initial diffusion code synchronization after receiving in a receiver a CDMA-modulated signal, down-converting the CDMA-modulated signal into an analog signal, and sampling the analog signal to produce a complex digital signal, the device comprising:

a parallel complex correlator for generating N parallel complex correlation results indicative to the correlation between components of the sampled complex digital signal and N parallel complex diffusion codes generated by the receiver;

a parallel complex accumulator for accumulating in parallel K continuously-generated parallel complex correlation results;

a parallel energy detector for obtaining in parallel energy values of K accumulated parallel complex correlation results; and an adaptation ratio determiner for obtaining a ratio of a maximum energy value to a mean energy value using the energy values of the K accumulated parallel complex correlation results, comparing the ratio with a predetermined determination threshold, and, if the ratio is greater than or equal to the determination threshold, generating a search conclusion signal by determining that a code phase corresponding to the maximum energy value is a correct code phase.

7. The device of claim 6, wherein the adaptation ratio determiner generates a search control signal when it is determined that there are no code phases within the code phases of the N parallel complex diffusion codes, and wherein the device further comprises:

a PN code generation controller for generating a PN code control signal which represents a shift enable signal at intervals of consecutive K PN code periods, or a hold enable signal at intervals of consecutive N PN code periods, under the control of the search control signal; and a parallel complex PN code generator for generating the N parallel complex diffusion codes in response to the PN code control signal.

8. The device of claim 7, wherein the PN code generation controller comprises:

a counter having a clear input port at which the search control signal is received, and a hold input port, the counter for counting from 0 to N−1 and outputting the result; and a comparator for comparing the output value of the counter with N−1 to output the PN code control signal, wherein the PN code control signal is received via the hold input port of the counter.

9. The device of claim 7, wherein the parallel complex PN code generator comprises:

a linear feedback shift register for generating complex diffusion codes; and a shift register for generating complex PN codes having N phases in parallel while sequentially storing values generated by the linear feedback shift register.

10. The device of claim 9, wherein the parallel complex PN code generator generates the N parallel complex diffusion codes while sequentially shifting values generated by the linear feedback shift register using the shift register when the PN code control signal from the PN code generation controller represents a shift enable state, and moves N relative code phases between the sampled complex digital signal, which is input to the parallel complex correlator, and the N parallel complex diffusion codes by holding the shifting operations of the linear feedback shift register and the shift register, when the PN code control signal from the PN code generation controller represents a hold enable state.

11. The device of claim 7, wherein the adaptation ratio determiner comprises:

a maximum signal detector for detecting the maximum energy value from the energy values of the N respective components;

an adder for summing the energy values of the N respective components;

a subtracter for subtracting the maximum energy value from the output of the adder;

a first divider for obtaining a mean energy value by dividing the output of the subtracter by N−1;

a second divider for obtaining a ratio value by dividing the maximum energy value by the mean energy value;

a determiner for generating a determination value by comparing the ratio value with the predetermined determination threshold; and a determined state timing generator for generating the search conclusion signal and the search control signal in response to the determination value.

12. The device of claim 11, wherein the maximum signal detector comprises ($\log_2$ N) comparison output units for comparing two received signals with each other and outputting the greater signal among the two signals.

* * * * *